United States Patent [19]

Hermanson et al.

[11] 4,017,955

[45] Apr. 19, 1977

[54] APPARATUS FOR ATTACHING A WORKPIECE TO A CONTINUOUS LENGTH OF LINE

[75] Inventors: Gerald Peter Hermanson; David Murray Rickel, both of Maitland; Robert Joseph Carr, Winter Park, all of Fla.

[73] Assignee: Dayron Corporation, Orlando, Fla.

[22] Filed: June 9, 1976

[21] Appl. No.: 694,243

[52] U.S. Cl. .............................. 29/564.8; 29/33 K; 29/235; 29/417; 29/453; 29/782
[51] Int. Cl.² ...................................... B23P 19/04
[58] Field of Search ............. 29/417, 208 R, 200 R, 29/453, 235, 433, 241, 33 Q, 33 K, 33 S; 24/265 R, 265 BC

[56] References Cited

UNITED STATES PATENTS

| 3,009,585 | 11/1961 | Shelton | 29/433 X |
| 3,226,812 | 1/1966 | Young | 29/208 R X |
| 3,315,574 | 4/1967 | Field et al. | 29/453 |

FOREIGN PATENTS OR APPLICATIONS

| 637,681 | 3/1962 | Canada | 29/208 R |
| 493,969 | 10/1938 | United Kingdom | 29/208 R |

*Primary Examiner*—Victor A. DiPalma
*Attorney, Agent, or Firm*—Duckworth, Hobby, Orman, Allen & Pettis

[57] ABSTRACT

This invention relates to an automatic apparatus and method for coupling a workpiece to a specified position along a continuous length of line and then cutting the line to a predetermined length. A length of the line is clamped adjacent a leading section thereof and tensioned over the workpiece to which it is to be fastened. The tension is then regulated for providing slack in the line. Loop sections are then folded into the line and stuffed through one or more one way apertures in the workpiece. Additional tension is provided for unfolding the line within the apertures, thereby coupling the line to the workpiece. The length of line is then moved to another work area for being cut to the predetermined length. An apparatus in accordance with this method is also provided.

21 Claims, 9 Drawing Figures

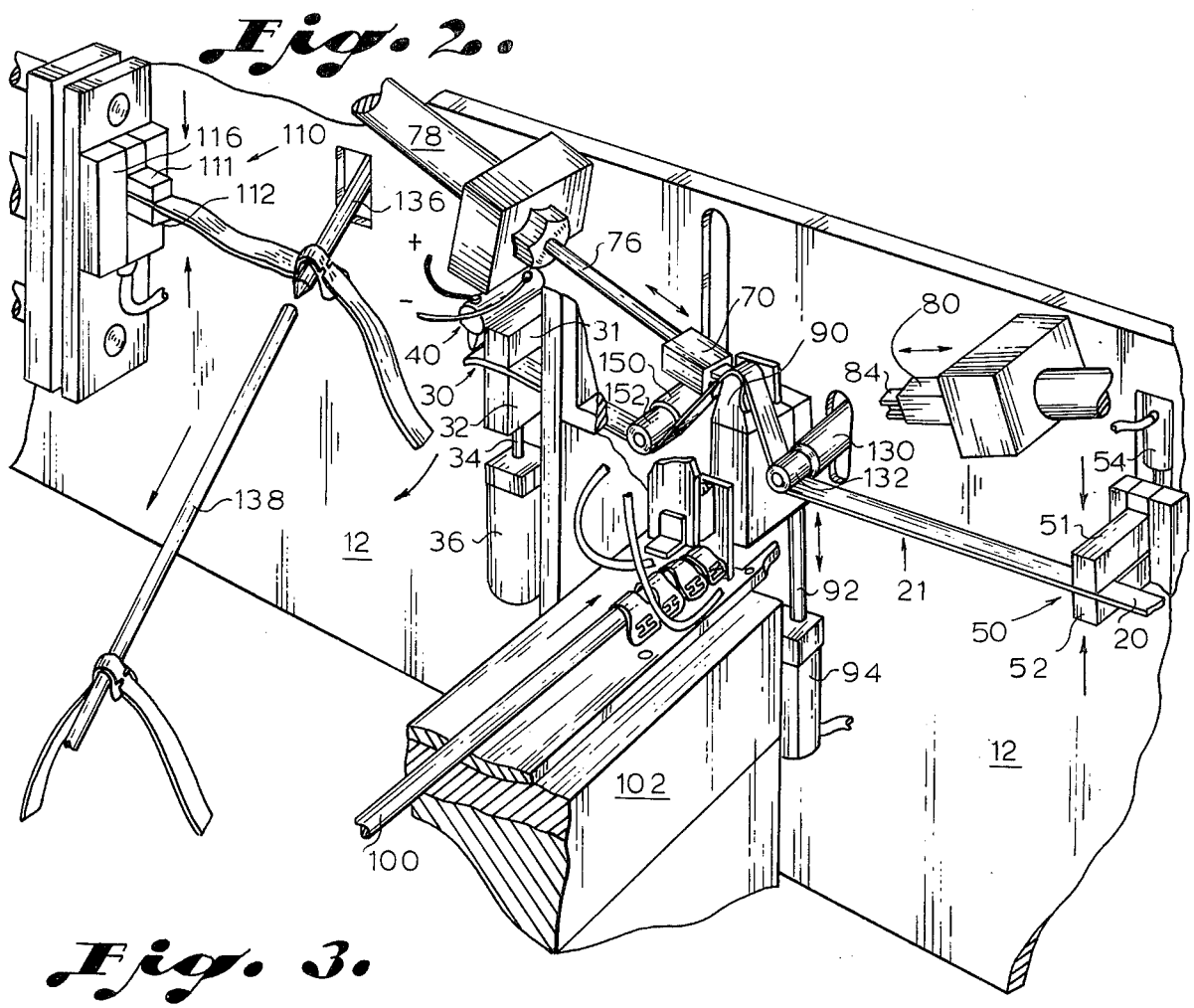
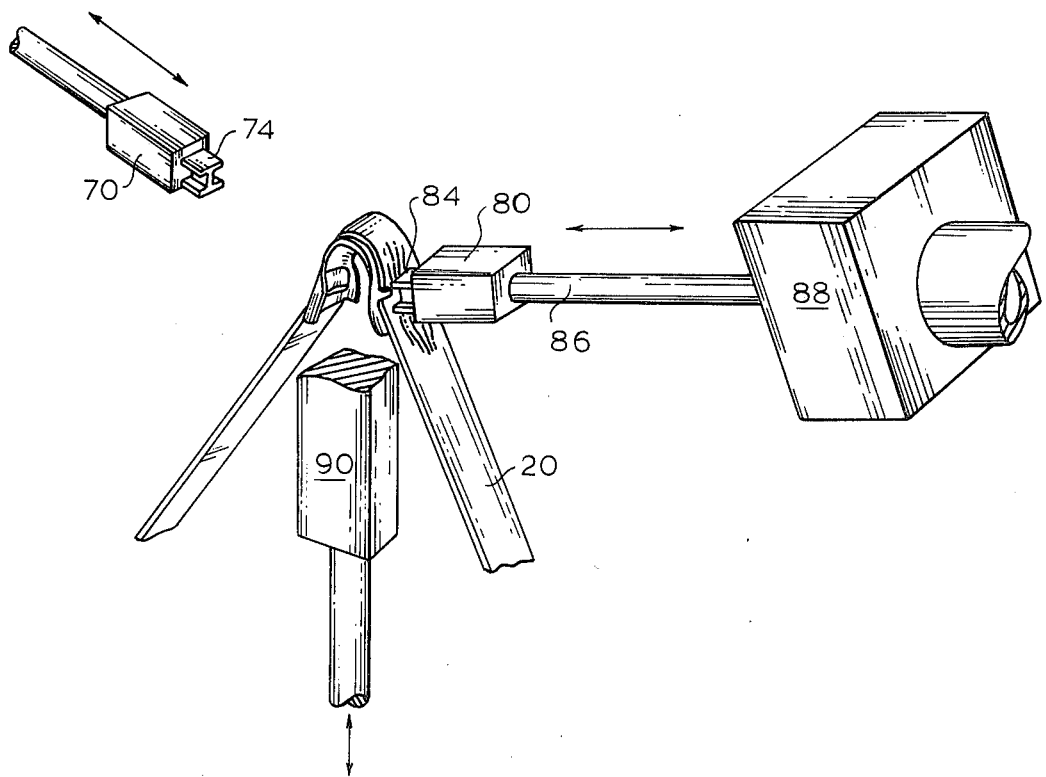

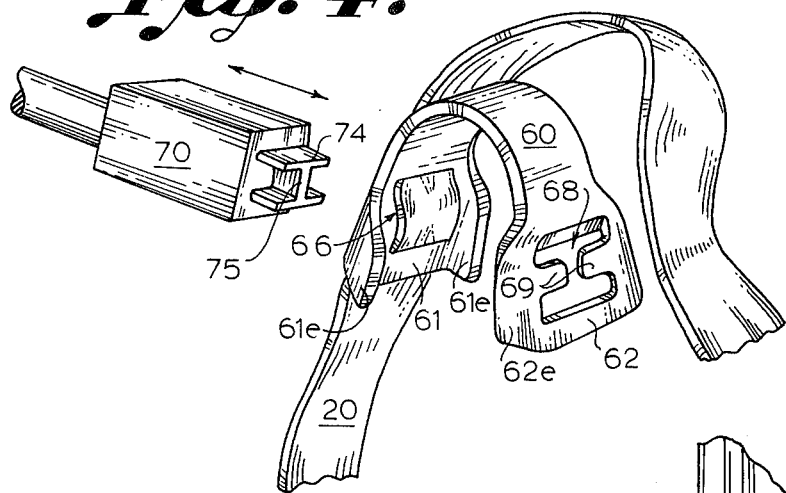
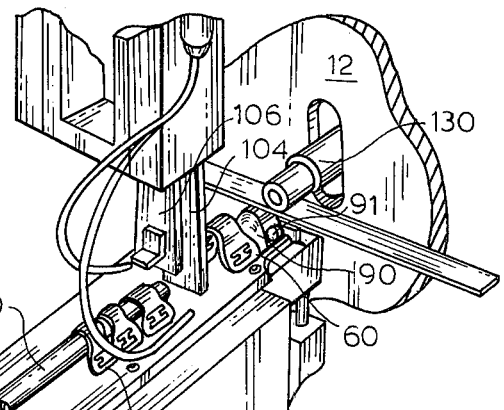
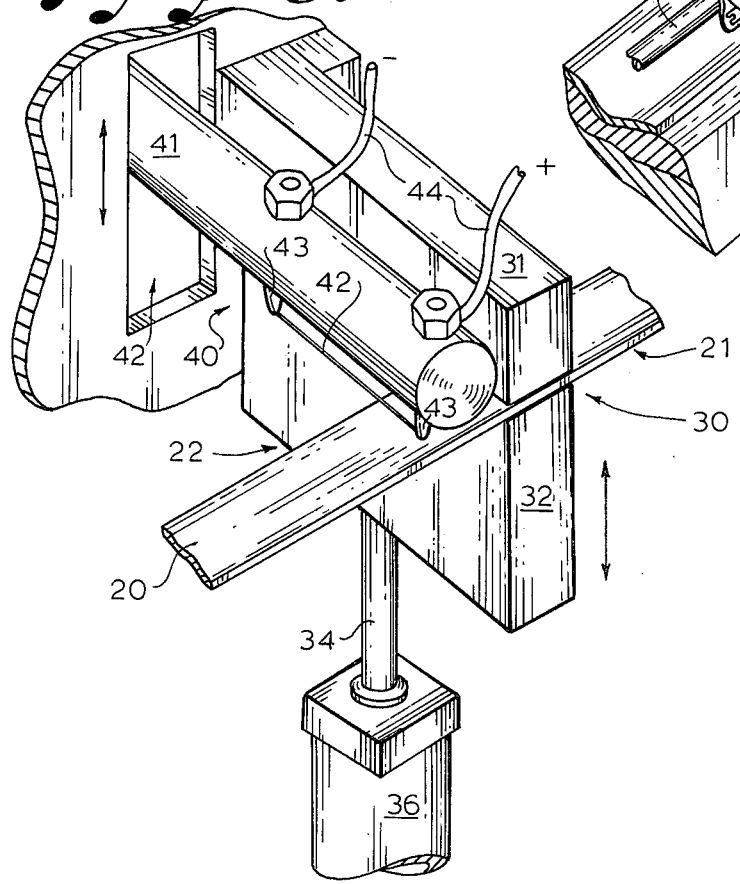

APPARATUS FOR ATTACHING A WORKPIECE TO A CONTINUOUS LENGTH OF LINE

BACKGROUND OF THE INVENTION

1. Field of the Invention

This invention relates to a method and apparatus for attaching a workpiece to a continuous length of line. In particular, this invention relates to a method and apparatus for coupling a U-shaped workpiece to a specified position along a continuous length of ribbon, and then cutting the ribbon to a predetermined length. In a later operation the distended ends of the ribbon are joined to form an endless loop which is used as an operative element in a bomb fuse apparatus.

2. Description of the Prior Art

Heretofore it has been customary to couple a line or ribbon through a workpiece by threading the ribbon through multiple sequential apertures located in the workpiece. It was then necessary to move the workpiece along the ribbon to the required position, and to tension the ribbon over the workpiece prior to cutting the ribbon to the predetermined length. Due to the complexity of the threading operation it was often necessary to accomplish the entire procedure by hand labor, an operation which was both expensive and slow. In the alternative, complex threading machines were required to thread an end of the ribbon through the appropriate apertures in the workpiece. These threading machines were not only slow, but were also subject to breakdown when the threading element missed the aperture and was impaled upon the workpiece. Furthermore, even after the ribbon was threaded through the apertures in the workpiece, it was necessary to pull the ribbons through the workpiece with great accuracy so that the workpiece would be located at a specified position along the predetermined length of ribbon.

In response to these problems, the present invention utilizes an arcuate shaped workpiece having special one way apertures located adjacent each end thereof. The one way apertures are specially designed to receive a folded section of the ribbon. When tension is placed upon the ribbon, it unfolds thereby retaining the ribbon within the one way aperture in the workpiece. By stuffing the folded ribbon through the one way aperture it is not necessary to pull the ribbon through the workpiece or to move the workpiece to the specific location along the ribbon. This locating procedure may be easily accomplished by pre-arranging the specified position of the ribbon adjacent to the one way apertures of the workpiece prior to the folding and stuffing process.

THE DRAWINGS

Other objects, features and advantages of the present invention will be obvious from a study of the written description and the drawings in which:

FIG. 2 illustrates a frontal perspective cut away view of the stuffing and cutting steps being performed by the apparatus.

FIG. 3 is an enlarged perspective cut away view of the stuffing steps being performed by the apparatus.

FIG. 4 is a frontal perspective view showing one section of the ribbon coupled through a one way aperture in the workpiece.

FIGS. 5, 6 and 7 illustrate the sequencing operation of loading the workpiece onto the workpiece coupler.

FIG. 9 is a frontal perspective view of the hot wire cutter.

SUMMARY OF THE INVENTION

The present invention relates to a method and apparatus for coupling a workpiece of the type having a one way aperture therein to a specified position along a continuous length of line, and then cutting the line to a predetermined length.

A method in accordance with the present invention comprises the steps of clamping a leading portion of the line, positioning a first one way aperture of the workpiece adjacent the specified position along the line, making a first fold in the line adjacent the first one way aperture, stuffing the first fold through the first one way aperture and then unfolding the first fold within the first one way aperture, thereby coupling the line to the workpiece. The line may be cut adjacent the trailing section thereof to a predetermined length.

An apparatus in accordance with the present invention comprises a workpiece receiving means for receiving the workpiece thereon and for tensioning the line over the workpiece. Tension adjusting means are provided for regulating the tension of the line over the workpiece. Stuffing means are included for folding the line adjacent the specified position and for inserting the fold through the one way aperture in the workpiece, whereby the tension on the line unfolds the folded line, thereby restricting the reverse direction passage of the line through the one way aperture. Cutting means are also provided for severing the line at the predetermined length.

DETAILED DESCRIPTION OF THE PREFERRED EMBODIMENT

Figure 1:
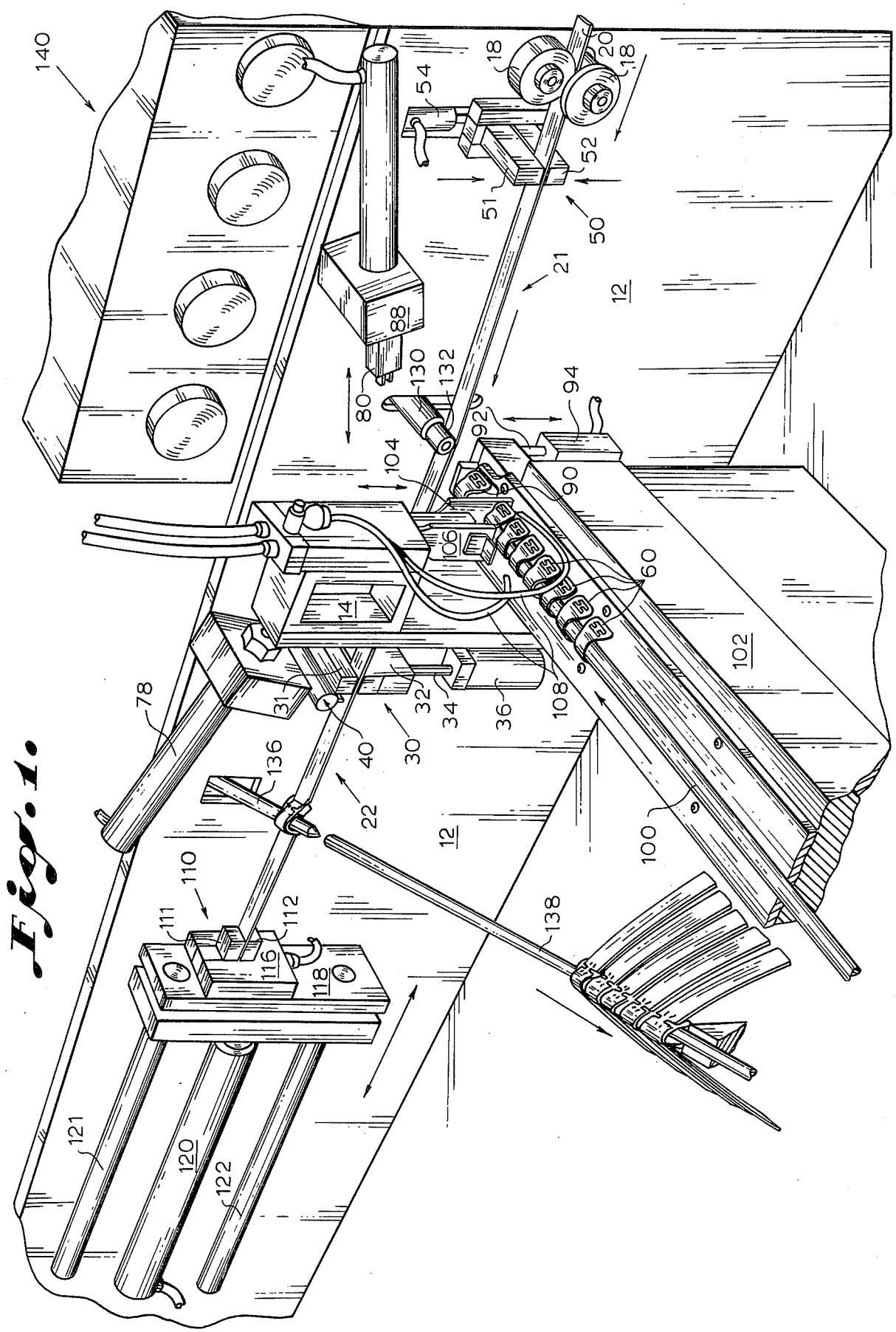
FIG. 1 illustrates a frontal perspective view of an apparatus in accordance with the present invention.

An apparatus in accordance with the present invention is illustrated in FIG. 1. The apparatus includes a frame 12 which runs longitudinally parallel to a length of line 20, which in this case is a flat ribbon having substantial strength for bearing longitudinal tension forces. The ribbon 20 is relatively thin and may be composed of a woven or plastic material. The length of ribbon 20 may be divided into a first section and a second section corresponding to the two general working areas 21 and 22 of the apparatus. A continuous length of the ribbon 20 is contained upon a roll (not shown) which is rotatably fastened to the frame 12, with the ribbon being unfurled from the roll and passing through opposite guide rollers 18. The inertia of the ribbon roll together with the friction of the guide rollers 18 provide a small reverse longitudinal bias on the ribbon 20.

As shown in FIGS. 1 and 9, a first clamp 30 which is coupled to the frame 12 defines the demarcation between the first working area 21 and the second working area 22. An upper jaw 31 is non-movably attached to the frame 12, while a lower jaw 32 movably communicates with an upper jaw 31 for restraining the movement of the ribbon 20 therebetween. The communicating surfaces of the upper jaw 31 and the lower jaw 32 are generally coplanar and may be coated with a rubber or other similar substance for increasing the sliding friction force upon the ribbon 20. The lower jaw 32 is coupled to a shaft 34 which is movably coupled to a pneumatic actuator 36, which is in turn coupled to the frame 12. The lower jaw 32 is pressed into communication with the upper jaw 31 by passing in pneumatic charge into the actuator 36, thereby extending the shaft 34.

With continuing reference to FIG. 9, a cutting means, shown generally as 40, comprises a cutting shaft 41 movably coupled to the frame 12 through an aperture 42. The cutting shaft 41 is actuated by a pneumatic or electro-magnetic actuator (not shown). An electrically heated hot wire cutter 42 is spaced from the cutting shaft 41 adjacent a lower section thereof by a plurality of electrical insulators 43. These electrical insulators 43 pass vertically through the cutting shaft 41 and have a source of electrical heating power coupled thereto by the electrical wires 44. The hot wire 42 is electrically heated for making a clean, cauterized cut through the ribbon 20 in the second working area 22 as the cutting shaft 41 is actuated in a downward direction. The hot wire 42 communicates adjacent a trailing portion of the ribbon 20 in the second working area 22, and is spaced from the first clamp 30 for providing a leading section of ribbon 20 projecting therefrom following the cutting process.

With reference to FIG. 1, a second clamp 50 comprises a lower jaw 52 and an upper jaw 51 which is movably attached to the frame 12 for being actuated by a pneumatic (or electro-magnetic) actuator 54. The communicating surfaces of the upper jaw 51 and the lower jaw 52 are generally coplanar for restraining the longitudinal movement of a trailing section of the ribbon 20 therebetween. These communicating surfaces may include a rubber or design impregnated surface for increasing the coupling friction with the ribbon 20.

The workpiece, shown generally as 60 in FIG. 4, comprises a generally rectangular piece of plastic material having a longitudinal axis bent in an arcuate or U-shape. The distended ends 61 and 62 of the workpiece 60 include peripheral ears 61e and 62e which are bent at an acute angle into the open mouth section of the U-shaped workpiece 60. The distended ends 61 and 62 of the workpiece 60 further include therein one way apertures 66 and 68 located generally along the longitudinal axis of the workpiece 60. The one way aperture 68 comprises a generally square void through the planar surface of the workpiece 60. Two protruding and opposing fingers 69 project into the aperture from a direction perpendicular to the longitudinal axis of the workpiece 60 and are located generally equidistant from the edges of the one way aperture 68. Furthermore, the edges of the one way aperture 68 which are perpendicular to the longitudinal axis of the workpiece 60 are beveled from an outside to an inside surface thereof to prevent unusual wear on the ribbon 20. The one way aperture 66 is identical to the illustrated one way aperture 68.

A first stuffer, shown generally as 70 in FIG. 4, is provided for stuffing a specified section of the ribbon 20 through the one way aperture 66 in the workpiece 60. The first stuffer 70 includes on a distended end thereof an H-shaped probe 74 having dimensions to couple within the similar H-shaped void comprising the one way aperture 66. A cross stem section 75 (or longitudinal ridge) communicates between the parallel edges of the probe 74 and has a width designed to provide sufficient clearance when the ribbon 20 is stuffed or folded through the one way aperture 66 between the opposing fingers thereof. This stuffing process is accomplished as follows. First, the specified section of the ribbon 20 is tensioned over the external surface of the workpiece 60. Next, the first stuffer 70 is extended toward the one way aperture 66 until the H-shaped probe 74 communicates with the ribbon 20. As the probe 74 is extended further into the one way aperture 66, the ribbon is folded longitudinally as it is compressed between the cross stem section 75 of the probe 74 and the opposing fingers of the one way aperture 66. This longitudinal fold is generally parallel to the longitudinal axis of the ribbon 20 and the workpiece 60. As the longitudinal edges of the ribbon 20 are forced through the one way aperture 66 and between the opposing ends thereof, a loop is created on the underneath side of the opposing fingers. The the first stuffer 70 may then be retracted from within the one way aperture 66, thereby allowing the tension to unfold the longitudinal fold in the ribbon 20 adjacent the inside surface of the workpiece 60. The opposing fingers of the one way aperture 66 restrain the loop fold of the ribbon 20, thereby preventing the ribbon 20 from passing through the one way aperture 66 in the reverse direction.

As illustrated in FIG. 2, the first stuffer 70 is attached at an end of a shaft 76 which is extendible from and retractable within a pneumatic actuating means 78. The actuating means 78 is coupled to the frame 12 for providing the correct angle such that the probe 74 of the first stuffer 70 passes generally perpendicularly through the one way aperture 66 in the workpiece 60. As shown in FIGS. 1, 2 and 3, a second stuffer 80 is coupled to a shaft 86 for being extended from and retracted within a pneumatic (or electro-magnetic) actuating means 88 which in turn is coupled to the frame 12. A distended end of the second stuffer 80 includes an H-shaped probe 84, identical to probe 70, for folding the ribbon 20 as it passes congruently through the one way aperture 68 in the workpiece 60.

The workpiece 60 is held in the proper position during the stuffing operation by a workpiece coupler shown generally as 90 in FIGS. 1, 2, 5, 6 and 7. The workpiece coupler 90 comprises an arcuate support shaped to congruently couple with an inner surface of the workpiece 60 such that the ears 61e and 62e lightly engage the base of the workpiece coupler 90. Furthermore, the workpiece coupler 90 includes recesses therein (shown as 91 in FIG. 6) spaced adjacent to the one way apertures 66 and 68 for allowing the ribbon 20 and the respective probes 74 and 84 to project thereinto. The workpiece coupler 90 is coupled to a shaft 94 which is extendible from and retractable within a pneumatic or electro-magnetic motive means 94, which in turn is coupled to the frame 12. The workpiece coupler 90 is retracted to a lower position for receiving a new workpiece 60. The workpiece 90 is vertically extended for being operated upon by the frist stuffer 70 and the second stuffer 80. As the workpiece coupler 90, having the workpiece 60 coupled thereto, is vertically extended, it communicates with and tensions the ribbon 20 over the external surface of the workpiece 60.

A first tension adjusting shaft 150 communicates through an aperture in the frame 12 for coupling with the inner surface of the ribbon 20 on the leading side of the workpiece coupler 90. A ribbon guide 152 is included at the distended end of the first tension adjusting shaft 150 for guiding the ribbon 20 therethrough. The second tension adjusting shaft 150 is downwardly extended in a direction perpendicular to the longitudinal length of the ribbon 20 by a pneumatic (or electromagnetic) actuator (hidden) coupled between the first tension adjusting shaft 150 and the frame 12. A second tension adjusting shaft 130 communicates through an aperture in the frame 12 for coupling with the upper surface of the ribbon 20 on the trailing side of the workpiece coupler 90. A ribbon guide 132 is included at the distended end of the second tension adjusting shaft 130 for guiding the ribbon 20 therethrough. The second tension adjusting shaft 130 is downwardly extended in a direction perpendicular to the longitudinal length of the ribbon 20 by a pneumatic (or electromagnetic) actuator (hidden) coupled between the second tension adjusting shaft 130 and the frame 12.

Figure 6:
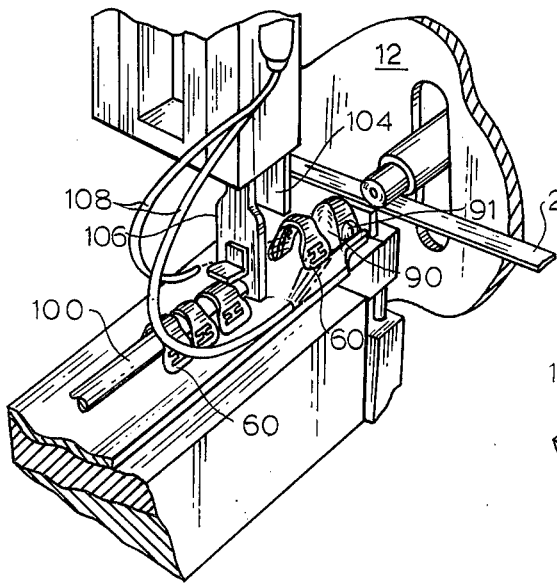
Figure 7:
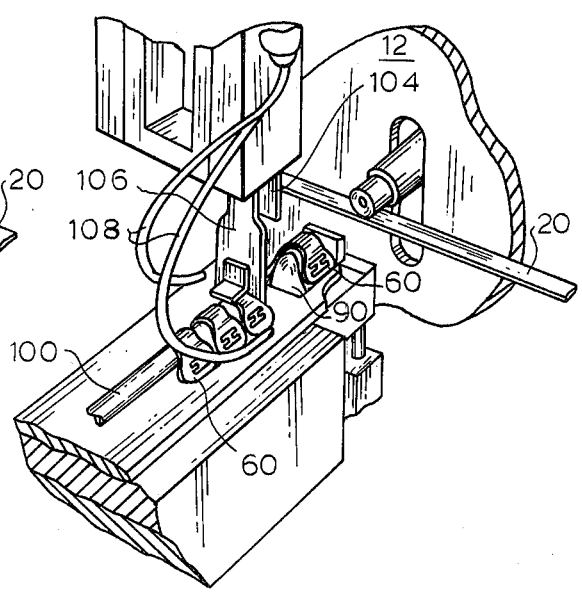

As illustrated in FIGS. 1 and 2, a plurality of the workpieces 60 are stored on a longitudinal guide 100. The longitudinal guide 100 is coupled to a vibration element 102 which in turn is coupled to the frame 12. The longitudinal guide 100 is oriented generally perpendicular to the length of the ribbon 20, whereby the vibration element 102 causes a sequential advancing of the workpieces 60 toward the workpiece coupler 90. As shown in FIG. 1, the longitudinal motion of the workpieces 60 along the longitudinal guide 100 is restrained by operation of a first sequencing element 104 extendible and retractable in a vertical direction at the end of the longitudinal guide 100 and adjacent the workpiece coupler 90. As the workpiece 60 moves into communication with the first sequencing element 104, a second sequencing element 106 is extended vertically parallel thereto on the opposing side of the workpiece 60. At the proper time, the first sequencing element 104 is vertically retracted, as shown in FIG. 6, for allowing a charge of compressed air from the air hoses 108 to propel the workpiece 60 onto the workpiece coupler 90 as shown in FIG. 7. Following the loading process, the first sequencing element 104 is again extended and the second sequencing element 106 retracted to allow the following workpiece 60 to be vibrationally transferred along the longitudinal guide 100 to a position between the first sequencing element 104 and the second sequencing element 106. The first sequencing element 104 and the second sequencing element 106 are independently extended and retracted by operation of pneumatically (or electro-mechanical) controlled actuators (hidden) which are both coupled to a sub-frame 14, which in turn is coupled to the main frame 12.

Figure 8:
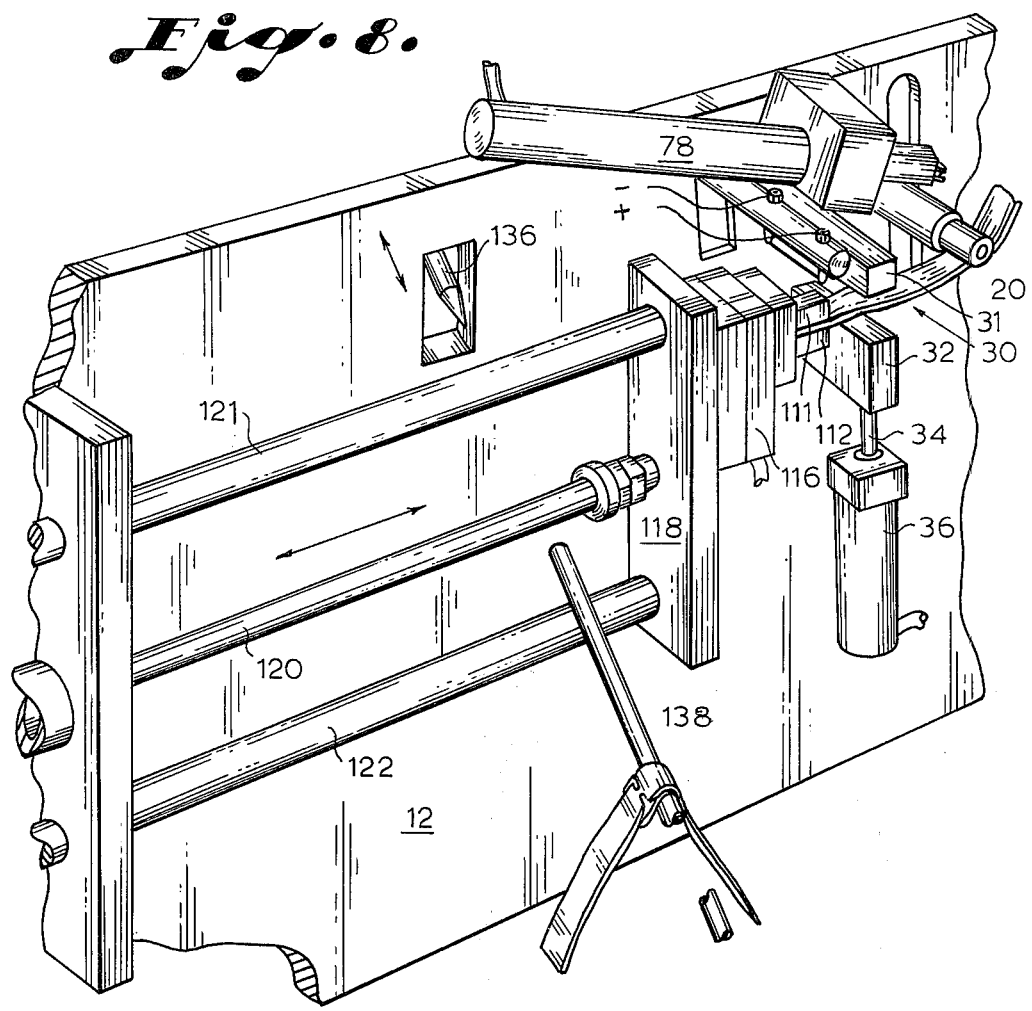
FIG. 8 is a frontal perspective illustration of the third clamp coupling to a leading section of the ribbon.

After the ribbon 20 has been coupled through the one way apertures 66 and 68 in the workpiece 60, the first section of the ribbon 20 is advanced from the first working area 21 between the first clamp 30 and the second clamp 50 by the operation of a third claim 110. As shown in FIGS. 1, 2 and 8, the third clamp 110 comprises an upper jaw 111 and a lower jaw 112 juxtaposed therewith for coupling between parallel planar surfaces thereof the leading section of the ribbon 20. The parallel communicating planar surfaces of the upper jaw 111 and the lower jaw 112 are forced together by operation of a pneumatic (or electromechanical) actuating means, shown generally as 116. The third claim 110 together with the actuator 116 is coupled to an advancing plate 118 which is supported by a pair of parallel rods extending generally parallel to the longitudinal axis of the ribbon 20. Furthermore, an actuator rod 120, which is generally parallel to the support rods 121 and 122, is pneumatically operated for extending and retracting the third clamp 110. In the extended position the third clamp 110 couples to a leading section of the ribbon 20, and when retracted pulls the leading section of the ribbon 20, with the workpiece 60 attached at the specified location thereon, into a second working area 22, defined between the third clamp 110 and the first clamp 30. After the ribbon 20 has been drawn into the second working area 22, the first clamp 30 is closed and the hot wire cutter 42 is actuated for cutting the ribbon 20 to a predetermined length. Immediately thereafter the third clamp 110 is opened releasing the leading section of the ribbon 20.

The workpiece 60 attached to the ribbon 20 then falls into communication with a movable guide shaft 136 located immediately subjacent thereto. The workpiece 60, together with the ribbon 20 coupled thereto, then slides down the movable guide shaft 136 onto a main guide shaft 138 which is aligned colinear therewith and attached to the frame 12. In this manner a large number of finished workpieces may be sequentially collected upon the main guide shaft 138. As illustrated in FIG. 8, the movable guide shaft 136 is extendible from and retractable within an aperture in the frame 12 by operation of a pneumatic (or elelctro-magnetic) actuator (not shown). In this manner, as the third clamp 110 is extended toward the first clamp 30, the movable guide shaft 136 may be retracted within the aperture of the frame 12 for providing clearance therewith. Once the third clamp 110 has been retracted into the position as shown in FIG. 2, the movable guide shaft 136 may thereafter be re-extended into close communication with the main guide shaft 138.

The apparatus 10 further includes control means 140 for sequentially actuating the apparatus elements required for coupling the workpiece 60 to the ribbon 20, and for cutting the ribbon 20 to a predetermined length. This control means 140 generally comprises electronic circuitry for controlling pneumatic or electro-mechanical control elements designed to energize the previously-described actuators. Control means 140 of this type are well known in the art.

The operation of the apparatus 10 in accordance with the present invention will now be illustrated with reference to FIG. 1 as a preferred example of the general method as claimed. Initially, it will be assumed that a plurality of workpieces 60 have been loaded onto the longitudinal guide 100 and an initial workpiece 60 has been loaded onto the workpiece coupler 90. Furthermore, it will be assumed that a leading section of the ribbon 20 is firmly restrained within the first clamp 30 and that the trailing section of the ribbon 20 has been threaded through the open second clamp 50 and the guide rollers 18 from the supply reel (not shown).

First, the actuator 94 is energized for vertically extending the workpiece coupler 90 having the workpiece 60 coupled thereto. As the workpiece coupler 90 is extended, the ribbon 20 in the first working section 21 is tensioned over the workpiece 60 such that the specified position along the ribbon 20 is generally adjacent to the one way apertures 66 and 68 within the workpiece 60. After the workpiece coupler 90 has reached its full vertical extension, the first tension adjusting shaft 150 is cycled in a downward direction, thereby pulling more slack into the first working area 21.

The first stuffer 70 is then extended by operation of the actuator 78 until the ribbon 20 has been folded and inserted through the one way aperture 66. The first stuffer 70 is then retracted, followed by the extension of the second stuffer 80 for folding and inserting the ribbon 20 through the other one way aperture 68. If properly adjusted, the slack created by the movement of the first tension adjusting shaft 150 will be largely eliminated by the extra length of ribbon 20 which has been inserted through the one way apertures 66 and 68 of the workpiece 60. The second clamp 50 is then actuated for restricting the longitudinal movement of the ribbon 20 therein. Next, the second tension adjusting shaft 130 is cycled in a downward direction to increase the longitudinal tension on the ribbon 20, thereby causing the ribbon to completely unfold within the one way aperatures 66 and 68 for securely coupling the workpiece 60 to the ribbon 20 adjacent the specified position therealong. Next, the workpiece coupler 90 is moved vertically downward by operation of the actuator 94.

The movable guide shaft 130 is then retracted and the third clamp 110 is projected by the operation of the actuating shaft 120. This extension allows the open third clamp 110 to engage the leading section of the ribbon 20 extending from the first clamp 30. The third clamp 110 is then closed by operation of the actuator 116 restraining the leading section of the ribbon 20 therein. The first clamp 30 and the second clamp 50 are then opened, followed by the retraction of the third clamp 110 caused by the actuating shaft 120 being energized. As the third clamp 110 is drawn away from the first clamp 30, the predetermined length of ribbon 20, with the workpiece 60 attached thereto, is drawn through the open first clamp 30 until the workpiece 60 is positioned vertically adjacent to the main guide shaft 138. The first clamp 30 is then closed for restraining the longitudinal movement of the ribbon 20 therein.

The movable guide shaft 136 is then extended to a position immediately subjacent to the workpiece 60. Next, the cutter shaft 41 is actuated in a downward direction causing the hot wire cutter 42 to slice through the trailing section of the ribbon 20 adjacent the first clamp 30. After the ribbon 20 has been cut, the third clamp 110 is opened to allow the workpiece 60 to fall into communication with the movable guide shaft 136 and be drawn by gravitational forces in a downward direction onto the main guide shaft 138 for storage thereon.

It will be understood that during the cutting process, the workpiece coupler 90 is simultaneously being extended in a vertical direction for coupling another workpiece 60 to a length of ribbon 20 within the first work area 21. Furthermore, this operation has been preceded by the loading of a sequentially adjacent workpiece 60 from the longitudinal guide 100 onto the workpiece coupler 90. This loading operation is generally accomplished in two steps. First, the first sequencing element 104 is extended downwardly and the second sequencing element 106 is retracted upwardly, thereby allowing the next workpiece 60 to be transported therebetween (see FIG. 5). Following this step the second sequencing element 106 is extended and the first sequencing element 104 is retracted (see FIG. 6). As the workpiece coupler 90 is retracted to its downward or noncommunicating position, the workpiece 60 is expelled by compressed air from the hoses 108 for transporting the workpiece 60 onto the workpiece coupler 90 (see FIG. 7). This process of loading the workpiece 60 onto the workpiece coupler 90 may generally be accomplished as the third clamp 110 is drawing the ribbon 20 through the first working area 21.

It should be understood at this point that the present invention should not be limited in its application to the construction details illustrated in the embodiment shown in the accompanying drawings, since this apparatus and method are capable of being constructed in a variety of different embodiments and procedures. Also, it must be understood that the terminology and descriptions employed herein are used solely for the purpose of describing the preferred embodiment and method, and should not be construed as limitations on the operability of the invention.

I claim:

1. An apparatus for coupling a workpiece of the type having a one way aperture therein to a specified position along a continuous length of line and then cutting said line to a predetermined length, said apparatus comprising in combination:

workpiece receiving means for receiving the workpiece thereon and for moving the workpiece into communication with the line adjacent the specified position therealong for tensioning the line over the workpiece;

tension adjusting means for regulating the tension of the line over the workpiece;

stuffing means for inserting the line through the one way aperture in the workpiece, thereby coupling the workpiece to the line; and cutting means for severing the line at the predetermined length.

2. The apparatus as described in claim 1 further comprising in combination:

first clamping means for disengagably coupling to a leading section of the line for restricting the movement thereof; and second clamping means for disengagably coupling to a trailing section of the line for restricting the movement thereof, with said second clamping means being spaced from said first clamping means for defining a first working area therebetween.

3. The apparatus as described in claim 2 further comprising in combination:

third clamping means for disengagably coupling to said leading section of the line; and extending means coupled to said third clamping means for extending said third clamping means to engage said leading section of the line and for retracting said third clamping means, with the line and the workpiece coupled thereto, into a second working area.

4. The apparatus as described in claim 3 further comprising control means for sequentially actuating said first clamping means, said workpiece receiving means, said tension adjusting means, said second clamping means, said stuffing means, said cutting means, and said extending means in a predetermined order.

5. The apparatus as described in claim 3 wherein said cutting means is located adjacent said first clamping means for cutting the line within said second working area, whereby said trailing section of the line is severed thereby creating another leading section of the line adjacent said first clamping means.

6. The apparatus as described in claim 5 wherein said cutting means comprises:

a wire heated by conducting electric current therethrough; and means for passing a longitudinal length of said hot wire through the line.

7. The apparatus as described in claim 6 further comprising means for removing each of the workpieces after said cutting means has cut the predetermined length of line from the continuous length thereof.

8. The apparatus as described in claim 7 wherein said workpiece removing means comprises in combination:
a main guide for sequentially receiving said workpieces thereon;
a movable guide spaced above but aligned generally colinear with said main guide, said movable guide for receiving the workpiece by gravitational feed; and
means for retracting and extending said movable guide subjacent to the workpiece during the cutting of the line, thereby allowing said third clamping means to pass therethrough.

9. The apparatus as described in claim 7 wherein said first, second and third clamping means each comprise:
paired jaws having juxtaposed distended ends for coupling the line therebetween; and
means for opening and closing said paired jaws, thereby removably clamping the line therebetween.

10. The apparatus as described in claim 2 wherein said workpiece receiving means comprises in combination:
a workpiece coupler for receiving the workpiece thereon, with said workpiece coupler further having a recessed area in a surface thereof juxtaposed with the workpiece for receiving therein said stuffing means; and
means coupled to said workpiece coupler for extending and retracting the workpiece into communication with the specified position of the line, thereby tensioning the line over the workpiece.

11. The apparatus as described in claim 10 further comprising:
storage means for receiving a plurality of the workpieces therein; and
loading means for sequentially receiving the workpieces from the said storage means and loading the workpieces onto said workpiece coupler.

12. The apparatus as described in claim 11 wherein said storage means comprises in combination:
a longitudinal guide for sequentially receiving the workpieces; and
vibration means coupled to said longitudinal guide for sequentially feeding the workpieces into a ready position adjacent said transport means.

13. The apparatus as described in claim 12 wherein said loading means comprises in combination:
a source of compressed air; and
transport means for controllably releasing said compressed air toward one of the workpieces adjacent said ready position to propel the workpiece from said storage means onto said workpiece coupler.

14. The apparatus as described in claim 10 wherein said tension adjusting means comprises:
a first line coupler for communicating with the line; and
first motive means for controllably extending and retracting said first line coupler into communication with the line for regulating the tension therealong.

15. The apparatus as described in claim 14 wherein said tension adjusting means further comprises:
a second line coupler, spaced on the opposite side of said workpiece receiving means, for communicating with the line; and
second motive means for controllably extending and retracting said first line coupler into communication with the line for regulating the tension therealong.

16. The apparatus as described in claim 10 wherein said stuffing means comprises in combination:
a first probe for communicating with and carrying the line through the one way aperture within the workpiece; and
means for projecting and retracting said first probe within the one way aperture of the workpiece.

17. The apparatus as described in claim 16 wherein the one way aperture comprises a generally square aperture having two opposing finger appendages therein, thereby forming an H-shaped one way aperture; and wherein
said first probe has a characteristic H-shape for congruently coupling through said H-shaped one way aperture.

18. The apparatus as described in claim 17 wherein said line is a ribbon.

19. The apparatus as described in claim 18 wherein the spacing between said two opposed finger appendages of said one way aperture is greater than the width of a cross-stem section of said H-shaped first probe, with said cross-stem section for folding said ribbon as said first probe pushes said ribbon through said H-shaped one way aperture, whereby the tension on said ribbon unfolds said ribbon after passing through said H-shaped one way aperture for being restrained therein by said two opposing finger appendages.

20. The apparatus as described in claim 19 wherein said two opposing finger appendages are generally perpendicular to the longitudinal dimension of said ribbon coupled thereto.

21. The apparatus as described in claim 20 further comprising another H-shaped one way aperture spaced from said H-shaped one way aperture at an opposite end of said workpiece.

* * * * *

UNITED STATES PATENT OFFICE
CERTIFICATE OF CORRECTION

PATENT NO. : 4,017,955
DATED : April 19, 1977
INVENTOR(S) : HERMANSON, et al.

It is certified that error appears in the above-identified patent and that said Letters Patent are hereby corrected as shown below:

Column 4, line 54, change "frist" to --first--.

Column 5, line 51, change "claim" to --clamp-- and
line 60, change "claim" to --clamp--.

Column 6, line 23, change "elelctro" to --electro--.

Signed and Sealed this

Thirteenth Day of September 1977

[SEAL]

Attest:

RUTH C. MASON
Attesting Officer

LUTRELLE F. PARKER
Acting Commissioner of Patents and Trademarks